Dec. 17, 1929.  S. HOHULIN  1,739,674
SUPPORT FOR MILKING PAILS
Filed April 13, 1928
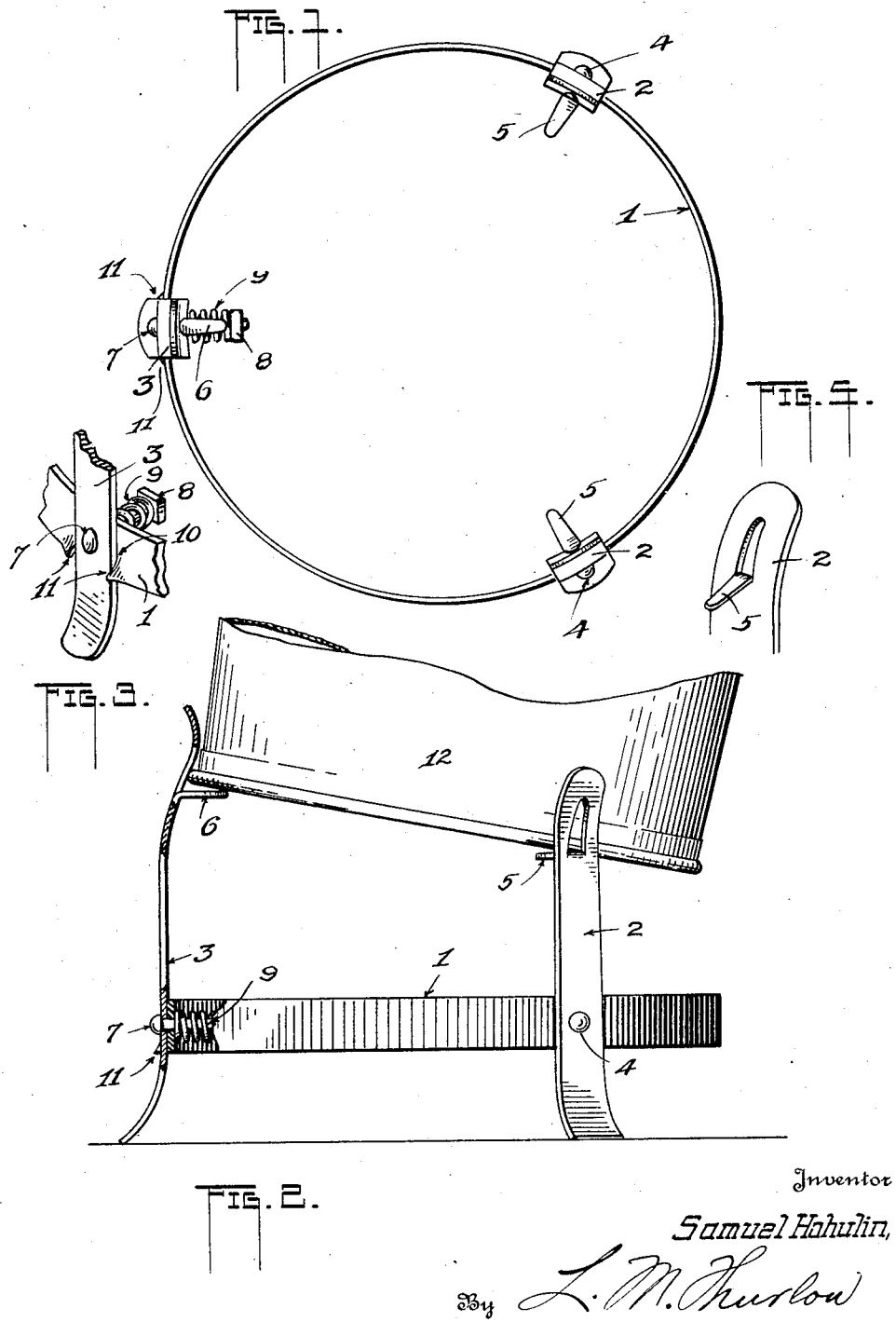
Inventor
Samuel Hohulin,
By L. M. Thurlow
Attorney Patented Dec. 17, 1929

1,739,674

UNITED STATES PATENT OFFICE

SAMUEL HOHULIN, OF GOODFIELD, ILLINOIS; H. B. SCHUMACHER ADMINISTRATOR OF SAID SAMUEL HOHULIN, DECEASED

SUPPORT FOR MILKING PAILS

Application filed April 13, 1928. Serial No. 269,663.

This invention pertains to a support or stand for milking pails, being directed particularly to a stand for holding a milk pail during milking.

The main object of the invention is to provide a simple form of support or stand in which a milking pail may be placed and held, and which will support the latter at a proper height during milking and also by which the pail is kept clean and sanitary by being supported above the floor or ground.

Another object is to provide a support or stand in which a pail or bucket can be placed and held preferably by friction, said stand being so constructed that the said pail or bucket can be supported at a proper working height, and by which it can be given the proper tilt toward the cow's udder.

Still another object is that of furnishing a simple support or stand of low cost that will be self adjusting and which will grip a pail frictionally and which can be carried suspended from the latter.

Besides these objects, the invention is directed to certain details of construction by which the named objects can be realized.

In the appended drawing forming part hereof,

Figure 1 is a plan of my milking pail support.

Figure 2 is a side elevation of the same showing part of a pail mounted therein, and with parts broken away to better show detailed structures, and Figures 3 and 4 are perspectives of portions of certain parts entering into the construction of my device.

In hand milking operations it is customary for the person doing the milking to support the pail between the knees while holding it at an angle or slanted toward the cow's udder. However, if the udder chances to hang very low then it is usual for the operator to hold the pail between the ankles but in slanted position as before to the udder that the milk streams can be properly directed into the pail.

In addition, it is necessary in preparing for milking and often afterwards, to relinquish the pail so that certain duties can be performed and as the operator cannot always find a clean place in which to stand the pail that member must often be set down in dirty places and becomes wholly unsanitary, more or less filth being picked up by it.

Having in view the inconvenience of holding the pail, the danger of dropping it, or of spilling its contents, as well as the unclean conditions that so often arise, I have devised the device herein shown and to be described and which in practice has been found to be of great assistance and readily adaptable to use.

In the said drawing the character 1 denotes a ring or hoop preferably of metal, having attached thereto a series of legs 2 and 3, three of them being found best for the purpose, the same being about evenly spaced around the ring, forming a tripod. The legs 2, one of which is best shown in Figure 2, are preferably strips of metal lying at right angles to the plane of the ring in upright positions and secured rigidly to the latter by rivets 4, for example. These legs extend both above and below the ring and support the same above any surface upon which the device is placed. The upper extensions of the legs are longest and are preferably curved outwardly at their upper extremes and each has an ear 5 which may be "struck up" therefrom as perhaps best shown in Figure 4, said ears extending inwardly toward the center of the ring as in Figure 1.

The leg 3 is similar to the legs 2 but longer in that it extends a greater distance above the plane of the ring than do the said legs 2. It has an ear 6 similar to the ears 5 described, it being noted that it lies considerably above the level of the latter two for a purpose to be made known. Again, the leg 3 is not rigidly secured to the ring 1 but merely lies against the same. A bolt 7 extends through the leg and the ring and is provided with a nut 8 spaced inwardly from the ring, a compression spring 9 being interposed between the two.

The bolt is slightly less in diameter than the holes in said parts to permit the leg to rock with respect to the ring, or so that the upper extremity of the said leg may move in a line drawn therefrom through the ring's center, the spring constantly tending to hold said leg snugly against the ring.

Any means may be employed to maintain the leg in position at right angles to the plane of the ring, I having shown a suitable method as shown in Figure 3, which is that of slitting the ring 1 at positions at each side of the leg as at 10 and forcing the resultant corners outward at each side of such leg forming abutments 11 which engage opposite edges of that member preventing it from swinging edgewise on said bolt 7.

In Figure 2, the reference numeral 12 denotes a portion of a pail whose bottom rests upon the ear 6 of the leg 3 and upon the ears 5 of the legs 2, but one of which latter is shown in this figure, of course, the other lying beyond and behind the one illustrated. However, these ears 5 and 6 provide a three-point support for the pail, it being observed that the ear 6 since lying at a higher level than the others inclines the pail at an angle toward the cow's udder during milking.

Since the two legs 2 may be fixed on the ring, as explained, while the leg 3 is, in effect, pivotally attached or permitted to rock outwardly, and since, also, the upper ends of all of the legs may be outwardly flared, especially that of the leg 3, it is clear that the pail may be first placed upon the two ears 5 and then by pushing its opposite side downwardly against the outwardly flared portion of said leg 3 the pail will force the latter outward and then drop upon the ear 6, the spring acting to return the leg to engage the pail and thus all of the legs frictionally secure said pail to the device, and the pail may be carried about with the said device hanging therefrom.

In use the stand may rest upon the floor supporting the pail clear of the same, and at the proper angle, depending upon the desired difference in height between the said ears 5 and 6.

The device may be made to support the pail at any desired height to suit the needs, i. e., to accommodate udders that hang high or low, and while I have described and shown but one way of constructing the said device and but one way of attaching and controlling the leg 3, it is to be understood that it is not my intention to be confined to that particular showing. As an example the legs may all be rigidly attached to the ring and be flexible as accomplishing the desired end.

I claim:

1. A support for a milking pail comprising a ring, a pair of spaced upright legs affixed near their lower ends to said ring, a third leg opposed to the said legs and connected near its lower end to said ring adapted to flex outwardly with respect to the same and normally having a substantially upright position, and each leg including an ear near its upper end extending into the space inward from the legs, one of the named ears lying at a higher elevation on the leg of which it is a part than do the portions of the other legs.

2. A support for a milking pail comprising a ring, a plurality of upright legs spaced around the same, a bolt extending through one of the legs and the ring, a spring compressed between the ring and a part of the bolt for holding the leg elastically against the ring, said leg adapted to outwardly flex with respect to the ring, the other legs being secured to said ring, and each leg having an ear above the ring extending into the space above same, one of said ears lying at a higher elevation than the ears of the other legs.

In testimony whereof I affix my signature.

SAMUEL HOHULIN.